United States Patent Office 2,895,994
Patented July 21, 1959

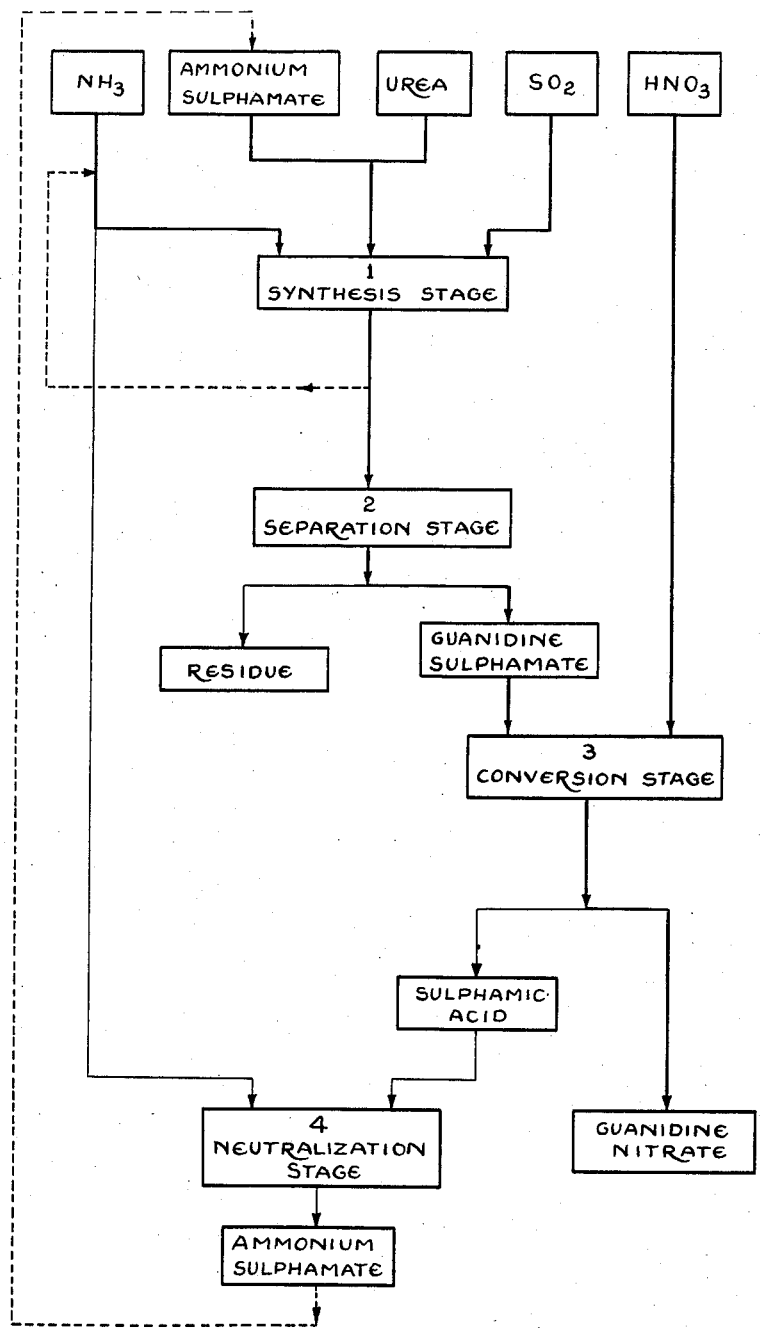

2,895,994
METHOD OF PRODUCING GUANIDINE NITRATE

Joseph Newton Robinson and Frederick John Leslie Miller, Trail, British Columbia, and Basil McDonnell, Rossland, British Columbia, Canada, assignors to The Consolidated Mining and Smelting Company of Canada Limited, Montreal, Quebec, Canada, a company of Canada Application May 17, 1956, Serial No. 585,502

3 Claims. (Cl. 260—564)

This invention relates to the production of guanidine nitrate and is particularly directed to an improved method for the manufacture of guanidine nitrate from readily available raw materials.

Guanidine nitrate is relatively well known and is used in the manufacture of explosives and explosive mixtures, in disinfectants and photographic chemicals. It is a white granular substance having the chemical formula $$H_2NC(NH)NH_2 \cdot HNO_3$$

Guanidine nitrate is usually produced by chemical reactions in which cyanamide or dicyandiamide is an essential constituent, for example, by reacting one of these compounds with ammonium nitrate in the molten state at elevated temperatures.

We have found that guanidine nitrate can be produced in high yield under moderate temperature and pressure conditions in aqueous solutions. The method involves, in essence, the step of reacting guanidine sulphamate with nitric acid to form guanidine nitrate and sulphamic acid. Guanidine nitrate substantially free from impurities is recovered from the reaction mixture. Sulphamic acid also can be recovered.

A very satisfactory method of producing guanidine sulphamate is that of reacting urea, sulphur dioxide, ammonia and ammonium sulphamate in a closed reaction vessel at a temperature above atmospheric temperature and under a superatmospheric pressure of ammonia. A reaction mixture is formed which contains a high yield of guanidine sulphamate. This method of producing guanidine sulphamate has the important advantages of moderate operating conditions; it is relatively easily controlled to produce a desired yield of guanidine sulphamate; the reaction mixture is in a fluid condition and can be removed from the reaction vessel without difficulty and is readily amenable to treatment for the recovery of the desired end product or products; and the method is ideally adapted for operation on a continuous scale. The method makes use of relatively inexpensive, readily available chemical compounds and is particularly well adapted to the production of guanidine nitrate from guanidine sulphamate as the sulphamic acid by-product formed with guanidine nitrate can be neutralized to make ammonium sulphamate for use in the synthesis of guanidine sulphamate.

The method of producing guanidine nitrate is described in detail in conjunction with the preferred method of producing guanidine sulphamate described above.

1. Production of guanidine sulphamate by synthesis

The production of guanidine sulphamate by reacting urea, ammonia, sulphur dioxide and ammonium sulphamate at a temperature above atmospheric temperature and under a superatmospheric pressure of added ammonia appears to involve a series of complex reactions accompanied by the formation of intermediate products but may be represented by the following equation:

$$2CO(NH_2)_2 + 3SO_2 + 2NH_4SO_3NH_2 + 4NH_3$$
$$\rightarrow 2CNH(NH_2)_2 \cdot HSO_3NH_2 + 2(NH_4)_2SO_4 + S$$

The yield of guanidine sulphamate from this reaction is high but the conversion is not complete as a small amount of cyclic products such as melamine and ammeline usually is formed. In the normal operation of the method, the yield of guanidine sulphamate is about 85% of the theoretical based on the urea present in the reaction mixture.

In operating this step of the method, the reactants preferably are passed continuously to a reaction vessel such as an autoclave or to the first of two autoclaves in series. The temperature in the reaction vessel is maintained at from about 280° C. to about 330° C., preferably at about 315° C., and the total pressure is maintained between about 400 and about 1000 pounds per square inch. This pressure is provided by the addition of excess ammonia to the reaction vessel. The total time of retention of the reaction mixture in the reaction vessel, or vessels, may range from 40 to 160 minutes at 280° C., and from 3 to 15 minutes at 330° C. At the preferred operating temperature of 315° C., the preferred time of retention in the reaction vessel is about 10 to 30 minutes, for example, 10 minutes in each of two autoclaves in series.

In operating the method on a continuous basis, reaction mixture is passed continuously from the autoclave to a cooling vessel where the temperature is reduced to about 140° C., such as by refluxing excess ammonia, and then to a pressure release vessel where the pressure is reduced to atmospheric pressure by release of ammonia. Ammonia evolved in the cooling and pressure release steps is recovered and can be returned to the process.

2. Separation of guanidine sulphamate from the reaction mixture

Reaction mixture from the pressure release vessel is transferred to a leaching tank wherein it is agitated in a first leaching step at about 40° C. with an aqueous solution saturated at about 30° C. with guanidine sulphamate and ammonium sulphate. Guanidine sulphamate is separated from the reaction mixture by being dissolved in the solution. The resulting solution is then separated from undissolved residue which contains sulphur and compounds such as melamine sulphate, ammonium sulphate and ammeline. The undissolved residue can be treated to recover separately elemental sulphur and any of these compounds, if desired.

The solution containing guanidine sulphamate is cooled to about 30° C. to precipitate guanidine sulphamate and ammonium sulphate which can be separated from the solution by filtration or by centrifuging. The guanidine sulphamate-ammonium sulphate solution is re-cycled to the first leaching step.

The mixture of guanidine sulphamate and ammonium sulphate separated from the first leach solution is leached at about 40° C. in a second leaching step with a solution saturated at about 30° C. with guanidine sulphamate but unsaturated at 30° C. with respect to ammonium sulphate. The resulting solution is then cooled to about 30° C. to precipitate relatively pure guanidine sulphamate without concurrent precipitation of ammonium sulphate. The precipitate and the solution are separated, such as by filtration or by centrifuging, and the solution is returned to the second leaching step, a portion being bled off to control the ammonium sulphate concentration.

The separation of guanidine sulphamate by a series of leaching and cooling steps at specified temperatures using aqueous solutions of specified concentrations is very effective for the production of guanidine sulphamate in very pure form. We have found that a series of two leaching and cooling steps is adequate in our method but further repetitions in the series can be carried out if extreme purity of the guanidine sulphamate salt is required.

The operating temperatures for the leaching and cooling steps may vary within relatively wide ranges. Temperatures in the range between 60° C. and 20° C. are most satisfactory with a spread of from about ten to twenty degrees between the upper and lower operating temperatures being most desirable to ensure effective separation and crystallization of the required products and economic operation. The dissolving temperature of about 40° C. and the precipitating temperature of about 30° C. suggested above are preferred conditions.

3. Conversion of guanidine sulphamate to guanidine nitrate

The conversion of guanidine sulphamate to guanidine nitrate is effected by acidification with nitric acid. The reaction can be expressed by the following equation:

$$CNH(NH_2)_2.HSO_3NH_2 + HNO_3 \rightarrow CNH(NH_2)_2.HNO_3 + HSO_3.NH_2$$

Guanidine sulphamate obtained in the previous step is dissolved in water in a first dissolving step and, after filtration to remove solid impurities, the solution is passed to a reaction vessel. Nitric acid, a cycling solution saturated at about 50° C. with sulphamic acid and almost saturated with guanidine nitrate, and a solution saturated at about 30° C. with guanidine nitrate are also added to this vessel. The temperature of the solution in this vessel is maintained at about 50° C. The solution withdrawn from the vessel is cooled to about 30° C. thereby precipitating guanidine nitrate which can be recovered readily by filtration. Water added to the acidification step with the guanidine sulphamate and the nitric acid dilutes the solution sufficiently to prevent crystallization of sulphamic acid on cooling to about 30° C.

Filtrate from the separation of guanidine nitrate is evaporated at about 50° C. to precipitate sulphamic acid. Precipitated solid sulphamic acid is separated from the solution which is saturated at about 50° C. with sulphamic acid and almost saturated with guanidine nitrate. This solution is cycled to the acidification step. The separated sulphamic acid is passed to a neutralization step described in detail hereinafter.

Guanidine nitrate crystals are leached in a third leaching step at about 30° C. with water and recycled guanidine nitrate solution. The resulting mixture is filtered to recover pure guanidine nitrate, which is dried and passed to storage. This crystalline guanidine nitrate constitutes the product of the process, and is substantially free from impurities.

The filtrate from this second guanidine nitrate separation step is returned partly to the third leaching step and partly to the acidification step.

Throughout the conversion stage of the method, solution temperatures are not permitted to rise above about 50° C. to 55° C. Temperatures appreciably above this range cause excessive hydrolysis of sulphamic acid to sulphuric acid with a resulting loss of sulphamate for recycling to the synthesis stage of the process and difficulties in separation of the various components in this stage of the process. The temperature difference of ten to twenty degrees between the upper temperature and the precipitation temperature for guanidine nitrate ensures that the separation is effective. Temperatures of about 50° C. and about 30° C. are preferred but may be varied to suit conditions of operation. As noted previously, the upper temperature limit of about 55° C. should not be exceeded.

4. Neutralization of sulphamic acid

In the neutralization step, sulphamic acid produced in the conversion step of the process is neutralized with ammonia to form ammonium sulphamate, which is recycled to the reaction step of the synthesis stage, the first step of the process. The neutralization reaction can be expressed by the following equation:

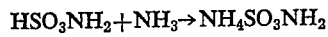
$$HSO_3NH_2 + NH_3 \rightarrow NH_4SO_3NH_2$$

Sulphamic acid crystals separated in the conversion stage are dissolved in a second dissolving step in aqueous ammonium sulphamate solution to which sufficient ammonia is added to neutralize the sulphamic acid, thus converting the sulphamic acid to ammonium sulphamate. The temperature during neutralization is about 80° C., maintained by the heat of reaction.

The resulting solution is cooled to about 30° C. to precipitate ammonium sulphamate which can be separated from the solution, such as by filtration or by centrifuging. The solution is returned to the second dissolving step.

Solid ammonium sulphamate is dried and returned to the synthesis stage of the process. This recycle of ammonium sulphamate results in a direct saving of sulphur dioxide and ammonia equivalent to the sulphamic acid produced.

The temperatures of about 80° C. and about 30° C. are preferred in the steps of the neutralization stage of the process, but other temperatures can be used provided that there is a sufficient difference between the upper and lower temperatures to ensure effective and economic separation of ammonium sulphamate.

The preferred materials employed in the construction of the leaching vessels and ancillary apparatus in contact with the reaction mixtures throughout the separation, conversion and neutralization stages of the process are stainless steel and aluminum.

In the synthesis stage, the reaction mixture is very corrosive, particularly at temperatures above about 140° C. Equipment such as the reaction vessel and cooling vessel is preferably made of stainless steel lined with a corrosion resistant material such as carbon or tantalum.

The following example illustrates, in conjunction with the attached flow sheet drawing, the operation of the process.

About 43 pounds of urea, 77 pounds of sulphur dioxide, 60 pounds of ammonia and 64 pounds of ammonium sulphamate are fed per minute into the synthesis stage, indicated by the numeral 1 in the attached flow sheet drawing. These materials are reacted at a temperature of about 315° C. and under a total pressure of ammonia of from about 500 to 600 pounds per square inch for a period of about 30 minutes, producing a reaction mixture which contains about 91 pounds of guanidine sulphamate, 98 pounds of ammonium sulphate, 6 pounds of melamine sulphate, 0.8 pound of ammeline, 14 pounds of sulphur and 0.8 pound of urea. Approximately 34 pounds of ammonia are released during the cooling and pressure release steps of this stage and returned to the synthesis stage. The reaction product is passed to the separation stage, indicated by the numeral 2, wherein guanidine sulphamate is separated from the reaction product. The residue from this separation stage contains about 4 pounds of guanidine sulphamate, about 98 pounds of ammonium sulphate, about 2 pounds of melamine sulphate, about 0.8 pound of urea, about 13 pounds of sulphur, about 0.6 pound of ammeline and about 5 pounds of water.

Guanidine sulphamate recovered from the separation stage is passed to the conversion stage, indicated by the numeral 3, wherein it is reacted with about 64 pounds of 55% nitric acid. The guanidine nitrate product recovered from this stage contains about 67 pounds of guanidine nitrate, less than 0.05 pound of ammonium sulphate, about 0.6 pound of melamine sulphate, less than 0.01 pound of urea, about 0.05 pound of sulphamic acid and a minute amount of water. That is, the resulting guanidine nitrate product is of about 99% purity.

Sulphamic acid recovered from the conversion stage is neutralized with ammonia in a neutralizing stage, indicated by the numeral 4, to produce ammonium sulphamate. About 64 pounds of ammonium sulphamate containing about 2 pounds of impurities are recovered from the neutralization stage and returned to the synthesis stage. Sufficient ammonium sulphamate is formed in the neutralizing stage to effect a substantial saving in the amount of sulphur dioxide and ammonia which otherwise would have been required for the synthesis stage.

The yield of guanidine nitrate recovered from the process when operating under the above described conditions is of the order of about 77.5% of the theoretical yield based on the amount of urea employed in the synthesis step.

The process of the present invention possesses a number of important advantages. The reaction between guanidine sulphamate and nitric acid is conducted at a relatively low temperature in aqueous solution without danger of explosion and with a satisfactory yield of guanidine nitrate of high purity. Guanidine nitrate is easily separated and recovered from the reaction product. The preferred method of making guanidine sulphamate is ideally adapted for use as a step in the overall process in that a high yield of guanidine sulphamate can be produced on a continuous basis under moderate temperature and pressure conditions. The reaction mixture from this step is in fluid condition and can be withdrawn without difficulty from the reaction vessel. Sulphamic acid produced in the guanidine sulphamate-nitric acid conversion step is easily converted to ammonium sulphamate which is cycled to the guanidine sulphamate synthesis step of the overall process effecting substantial savings in the ammonia and sulphur dioxide which otherwise would be required for that step of the process.

It will be understood, of course, that modifications can be made in the preferred embodiment of the invention described herein without departing from the scope of the invention as defined by the appended claims.

What we claim as new and desire to protect by Letters Patent of the United States is:

1. In a process for the production of guanidine nitrate in which ammonia, sulphur dioxide, urea and ammonium sulphamate are reacted to produce a reaction product which contains guanidine sulphamate, guanidine sulphamate is separated from the reaction product and is reacted with nitric acid to form a reaction product which contains guanidine nitrate and sulphamic acid, the improvement which comprises separating and separately recovering guanidine nitrate and sulphamic acid from the guanidine nitrate-sulphamic acid reaction product, neutralizing recovered sulphamic acid with ammonia to form ammonium sulphamate, and re-cycling so-formed ammonium sulphamate to the guanidine sulphamate forming step of the process.

2. The process for the production of guanidine nitrate according to claim 1 characterized in that the guanidine sulphamate-nitric acid reaction is conducted at a temperature below about 55° C.

3. The process for the production of guanidine nitrate according to claim 1 characterized in that the guanidine sulphamate-nitric acid reaction is conducted in a cycling solution which contains sulphamic acid and guanidine nitrate at a temperature below about 55° C. and above the saturation temperature of the cycling solution of sulphamic acid and guanidine nitrate, and guanidine nitrate and sulphamic acid are precipitated from the cycling solution in the order named by crystallization.

References Cited in the file of this patent

UNITED STATES PATENTS

| | | |
|---|---|---|
| 2,464,247 | Mackay | Mar. 15, 1944 |
| 2,653,976 | Mackay | Sept. 29, 1953 |
| 2,698,344 | Mills | Dec. 28, 1954 |
| 2,762,843 | Boivin | Sept. 11, 1956 |
| 2,768,203 | Hamilton | Oct. 23, 1956 |

FOREIGN PATENTS

| | | |
|---|---|---|
| 162,088 | Australia | Sept. 10, 1953 |
| 705,799 | Great Britain | Mar. 17, 1954 |